United States Patent [19]

Okamoto et al.

[11] 3,981,944
[45] Sept. 21, 1976

[54] METHOD FOR PRODUCING IMPACT RESISTANT THERMOPLASTIC RESIN BY CONTINUOUS BULK POLYMERIZATION

[75] Inventors: Takehiko Okamoto; Akihiko Kishimoto; Ikuo Nagai; Hiroshi Sato; Hotsuma Okasaka; Masakazu Inoue, all of Nagoya, Japan

[73] Assignee: Toray Industries, Inc., Tokyo, Japan

[22] Filed: June 12, 1974

[21] Appl. No.: 478,535

Related U.S. Application Data

[63] Continuation-in-part of Ser. No. 204,018, Dec. 2, 1971, abandoned.

[52] U.S. Cl. ............................. 260/880 R; 260/879
[51] Int. Cl.² ...................... C08L 9/02; C08L 9/06
[58] Field of Search ............. 260/878 R, 879, 880 R

[56] References Cited
UNITED STATES PATENTS

| | | | |
|---|---|---|---|
| 3,439,065 | 4/1969 | Luftglass | 260/880 R |
| 3,660,534 | 5/1972 | Carrock | 260/880 R |

*Primary Examiner*—Paul R. Michl

[57] ABSTRACT

A method is provided for continuously manufacturing high impact strength thermoplastic resins comprised of the sequential steps of (a) bulk-polymerizing a monomer solution, which contains a diene type rubber polymer or a graft polymer obtained by extracting the rubber polymer particle or vinyl monomer grafted polymer particle in latex with vinyl monomers which contain 5–20 percent by weight of water at a temperature of 85°–135°C, while continuously stirring the solution, vaporizing the volatile components, condensing the volatile component and recycling them back to reaction mixture, until the solid content in the reaction mixture reaches 40–75 percent by weight, and thereafter (b) bulk polymerizing the resulting prepolymer solution under the condition that plug-flowing can be attained with a temperature gradient 100°–170°C at the top of the reaction vessel and 170°–270°C at the bottom thereof, while the volatile component of the mixture are evaporated off, condensed and recycled to the reaction mixture, until the solid content is at least 90 percent by weight.

9 Claims, 3 Drawing Figures

Fig. 1

_Fig. 2_

_Fig. 3_

METHOD FOR PRODUCING IMPACT RESISTANT THERMOPLASTIC RESIN BY CONTINUOUS BULK POLYMERIZATION

This is a continuation-in-part of our abandoned application Ser. No. 204,018, filed Dec. 2, 1971.

BACKGROUND OF THE INVENTION

1. Field of the Invention

This invention relates to a continuous method for producing high impact resistant thermoplastic resins.

2. Description of the Prior Art

Acrylonitrile-butadiene-styrene copolymers (so called ABS resin), rubber modified polystyrenes (so called high impact polystyrene), and methylmethacrylate-butadiene-styrene copolymers (so called MBS resins) are valuable materials in the plastics industry. These rubber modified impact resistant thermoplastics resins are conventionally produced by emulsion polymerization. The polymers obtained according to conventional methods have excellent properties. However, in the processes of removing the polymers from the latices after polymerization, (i.e., by coagulation, dehydration, and drying) considerable deterioration of properties of the resins is encountered. Furthermore, the conventional processes are not satisfactory from an economic viewpoint.

In order to overcome the aforementioned problem methods have been devised wherein a vinyl monomer capable of being graft polymerized is added to the rubber polymer and the mixture is then subjected to bulk polymerization. However, heretofore satisfactory continuous bulk polymerization has not yet been obtained because removal of the great quantity of het generated during the polymerization is very difficult. Accordingly, control of polymerization temperature is difficult when the prior art processes are practiced on a commercial scale.

To control the polymerization temperature, it has been suggested to remove the heat of polymerization from the reaction system by taking off the monomer vapor alone or with a small quantity of water, condensing the monomer vapor and recycling the condensed monomer to the reaction mixture. This method must, however, be conducted under close control and at a rather relatively low conversion in the first polymerization stage, otherwise the reaction process is adversely affected resulting in the final polymer having and undesirable color and poor physical properties.

It has also been suggested to polymerize the monomer by using an initiator. But this method is not satisfactory because initiator remains in the final polymer which causes the deterioration of the polymer.

A further problem encountered by the methods heretofore suggested, is that the polymers obtained by conventional bulk polymerization are inferior to those obtained by emulsion polymerization in properties such as the impact resistance and luster. This is because it is difficult to obtain a homogeneous mixture of the reaction mixture in bulk polymerization because the viscosity of the reaction mixture is quite high.

It is accordingly an object of this invention to overcome the problems encountered with the prior art method of producing high impact resistant thermoplastic resins. The use of only a rubber polymer suspended in monomer solution, obtained by extraction of rubber polymer particles in latex with vinyl monomers, can accomplish this object.

It is a still further object of this invention to provide a continuous process for bulk polymerizing thermoplastic monomers so as to produce a high impact resin thermoplastic resin.

Another object of this invention is to provide a bulk polymerization method for producing high impact resistant resins continuously in which the heat of polymerization is effectively removed.

A still further object of this invention is to provide the continuous bulk polymerization method by which uniform mixing of the reaction system can be obtained.

Other objects and advantages of this invention will become further apparent hereinafter from a study of the drawing and a continued reading of the specification and subjoined claims.

SUMMARY OF THE INVENTION

A continuous bulk polymerization method is provided for producing high impact resistant thermoplastic resins which is comprised of sequential steps. The first step comprises continuously charging A. continuously charging a prepolymerization reactor with (1) a vinyl monomer solution of a vinyl composition which contains about 1–40 percent by weight of a diene type rubber polymer or a graft polymer obtained by extracting rubber polymer particles or vinyl monomer grafted rubber polymer particles in latex with vinyl monomers wherein said vinyl monomers consist of
   a. 60–90 percent by weight of styrene and 40–10 percent by weight of acrylonitrile or
   b. 0–70 percent by weight of styrene, 50–98 percent by weight of methylmethacrylate and 0–35 percent by weight of acrylonitrile and (2) 5–20 percent by weight of water;

B. mixing said monomer solution so as to maintain a substantially uniform mixture;

C. prepolymerizing said monomer solution at about 95°–130°C until the concentration of the solid contents of the resulting reaction product is about 40–75 percent by weight, with generation of vapor of water and monomer during said prepolymerization reaction, while simultaneously condensing the vapor volatilized during the prepolymerization reaction, separating the monomer solution from the resulting condensate and recycling the monomer solution at a rate of 20–60 percent by weight of feed monomer solution back to the prepolymerization reaction whereby a prepolymer solution is obtained.

The second step of the method comprises

D. charging said prepolymer solution in a polymerization reactor;

E. plug-flow advancing said prepolymer solution through said second reactor while gradually heating said prepolymer solution in a plurality of stages, starting at a temperature of about 100°–170°C up to about a temperature of 170°–270°C, polymerizing said prepolymer solution while vaporizing and recycling 5–20 percent by weight of the volatiles until the concentration of the solid components is at least about 90 percent by weight.

The second reactor is a tower type reactor in which a plug-flow reaction action can take place. It is likewise equipped with a device for condensing the vapor generated from the reaction mixture and recycling the recovered monomers. The second reactor includes a heating device for heating the reaction system in multi-stages.

DESCRIPTION OF THE PREFERRED EMBODIMENTS

The monomer solution polymerized in the process of this invention is preferably composed of (a) a vinyl compound or the mixture thereof consisting of (1) 60–100 percent by weight styrene and 0–50 percent by weight of acrylonitrile or (2) 0–70 percent by weight of styrene, 50–98 percent by weight of methylmethacrylate, and 0–30 percent by weight of acrylonitrile (b) at most 40 percent by weight of a diene type rubber polymer or the graft polymer obtained by graft polymerizing a vinyl compound onto a diene type rubber polymer, and (c) 5–20 per cent by weight of and more preferably 5–15 percent by weight of water, wherein the monomer solution is obtained by extracting the rubber polymer particle or vinyl monomer grafted rubber polymer particle with the aforesaid vinyl compounds.

In the method of this invention the preferred diene type rubber polymers are polybutadiene, butadiene-styrene rubber copolymer, and butadiene-acrylonitrile copolymer.

The preferred graft polymers for employment in this invention are rubber graft polymers which are obtained by emulsion graft polymerizing 2–45 parts of a vinyl compound or a mixture thereof consisting of 50–100 percent by weight of styrene and 0–30 percent by weight of acrylonitrile, and 45–98 parts by weight of a diene type rubber polymer, especially polybutadiene, butadiene-styrene rubber copolymer.

It is highly important in the method of this invention that the monomer solution contain 5–20 percent by weight of water, and preferably 5–15 percent by weight of water. The presence of 5–20 % water in the monomer solution makes it possible to remove the relatively large amounts of heat generated from highly viscous prepolymer in which conversion is as high as 40–75 percent by weight during polymerization as a result of the latent heat held by the azeotrope of water and the vinyl compound. In this way, the desired control of the polymerization temperature and also the rate of polymerization required for satisfactory bulk polymerization can be obtained. The water content in the monomer solution is 5–20 percent by weight since if more than 20 percent by weight is present, removal of the water from the polymerization system is difficult. However, when less than 5 percent by weight of water is present, the heat of polymerization from a highly viscous prepolymer in which conversion is 40–75 percent by weight is not effectively removed.

The content of the diene type rubber polymer or the graft polymer in the monomer solution is preferably 1–40 percent by weight and most preferably 5–35 percent by weight since if less than 1 percent by weight is present, the final polymer will not have a high impact resistance. However, if more than 40 percent by weight is present, the viscosity of the polymerization system is substantially increased to a point that homogeneous mixing and heating cannot be imparted to the reaction mixture.

It is an essential of this invention to prepare the monomer solution by one of the following methods since complicated treatments such as coagulations, washing and drying can be omitted.

The method comprises (1) blending the diene type rubber polymer or graft polymer in a latex form into the vinyl compound, if necessary, in the presence of a coagulating agent; (2) transferring polymer particles into the monomer phase, and (3) removing separated water phase to obtain a monomer solution in which the polymer particles are dissolved or dispersed in the mixture of the vinyl compound and water.

The monomer solution to be subjected to bulk polymerization can be directly prepared from the polymer latex by extracting the polymer therefrom by means of the solvent properties of the vinyl compound, followed by separating excess water therefrom so that a predetermined water content can be obtained. In this process, there is no special restriction on the kind of coagulating agent, but salts such as NaCl, $MgSO_4$, or the acids such as $H_2SO_4$ are preferably used. This process can be carried out by mixing the vinyl compound with the diene type rubber polymer or graft polymer in one step so that the concentration of the polymer in the resulting solution falls within a range in which it can be directly subjected to bulk polymerization. It is preferable, however, to carry out this process in two steps, namely, initially extracting the diene type rubber polymer or graft polymer with styrene, and thereafter adding the monomer consisting of acrylonitrile or methylmethacrylate to the resulting solution. This makes it easier to transfer the rubber particle into the vinyl monomer phase. The monomer solution so obtained is highly suitable for use in the bulk polymerization method of this invention, since it does not contain impurities such as emulsifying agents, coagulating agents, and so forth. Using this process, the diene type rubber polymers or graft polymers are suspended uniformly in the vinyl compound retaining the particle size which they had in the latex. Therefore, it is possible to obtain a monomer solution suitable for bulk polymerization according to the process of this invention.

Bulk polymerization is carried out either thermally or catalytically. There is no special requirement with regard to catalysts used, but ordinary organic peroxides or azo compounds are usually used. When a polymerization catalyst is used, polymerization is carried out at a temperature within the range from 50° to 200° C. When polymerization is carried out thermally, the appropriate polymerization temperature is within the range from 70° to 250° C.

Figure 1:
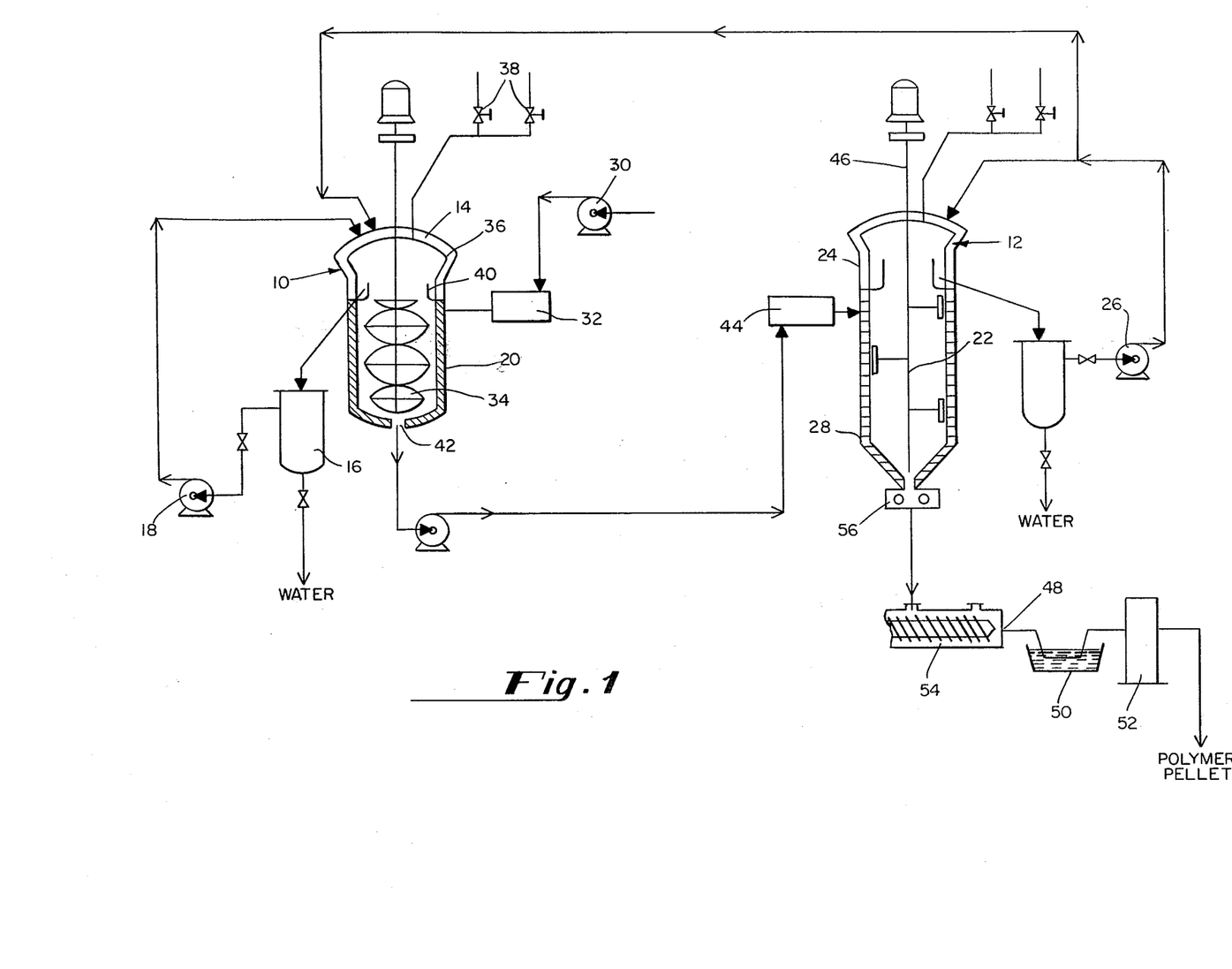
FIG. 1 is a schematic illustration of apparatus used in a first embodiment of the method of this invention.

A first embodiment of the method of this invention is shown in FIG. 1. The apparatus shown in FIG. 1 for carrying out the method of this invention is composed of a first reactor 10 and a second reactor 12. The first step of polymerization is carried out in the first reactor 10. It is necessary in order to maintain the concentration of the solids in the resulting prepolymer solution within the range of 40–75 percent by weight, to remove a substantial amount of heat generated by the polymerization reaction. For this purpose, the first reactor 10 is provided device 14, 40 for condensing the vapor generated from the reaction mixture, a device 16 for separating water from the resulting solution outside the reactor, a device 18 for recycling the resulting solution consisting mainly of monomer, and a device 20 for heating the reaction system homogeneously. The heat generated during polymerization can be effectively removed by the latent heat of evaporation.

In the first reactor, the complete mixing of reactants is essential in order to obtain prepolymers having a constant composition. If the reactants are insufficiently mixed resins of good luster, high transparency and high tenacity are not obtained.

The reaction temperature in the first reactor 10 must be maintained in the range from 95° to 135° C. When temperatures lower than 95° C are used, not only the desirable rate of polymerization is not obtained, but also the degree of polymerization is increased too much. However, when the temperature is higher than 135° C, not only does the rate of polymerization become too high to control the polymerization, but also the degree of polymerization is so low that the resulting polymer is not suitable for any practical use.

In the first reactor 10, the polymerization is carried out until the concentration of the solid components present in the reaction mixture is 40–75 percent by weight, and preferably 55–65 percent by weight. When the solid content is less than 40 percent by weight, the desired polymerization degree cannot be obtained in the second reactor. This results in the final resin having poor physical properties. However, when the solid content is more than 75 percent by weight the viscosity is increased so much that the complete mixing of reactants cannot be achieved in the first reactor.

The contents of the volatile component which is refluxed in the first reactor is 5–100 percent by weight and preferably 20–60 percent by weight based upon the charged monomer solution. When less than 5 percent by weight is refluxed, control of the reaction temperature cannot be effectively obtained, and it is impossible to remove a sufficient amount of water from the monomer solution. When more than 100 percent by weight is refluxed, the polymerization temperature falls to such a degree that it is impossible to maintain it at more than 95° C. Accordingly, the final product does not have good physical properties such as high luster, resistance to heat, impact resistance, and the like. And, moreover, the water content of the feed solution is very important. Water content of 5–20 percent by weight is most useful in removal of the heat of polymerization from the prepolymer in which conversion is a high as 40–75 percent by weight. When the water content is less than 5 percent by weight, the heat which must be removed from the high conversion prepolymer can not be removed effectively. And when the water content is over 20 percent by weight, too much excess heat must be added to the polymerization system to remove the water.

The prepolymer obtained in the first reactor is continuously charged into a second reactor 12. In the second reactor, it is necessary to maintain the concentration of solids in the reaction mixture within the desired range by heating the reaction mixture so that the reaction temperature is gradually raised as the reaction proceeds and, also, to remove any excess heat of proceeds and, also, to remove any excess heat of polymerization. For this purpose, the second reactor 12 is provided with a device 22 for transferring reactants in so called plug-flowing directions so that they are mixed in the horizontal direction, but not mixed in the direction of flow, a device 24 for condensing the vapor generated from the reaction system, a device 26 for recycling the resulting solution to the reactor, and a device 28 for heating the reaction system which is divided in the number of sections.

In the second reactor 12, a temperature gradient must be maintained along the length of the reactor 12 toward the outlet. The polymerization temperature must be adjusted from 100° to 170° C at the inlet of the reactor and to 170° to 270° C at the outlet of the reactor, otherwise, a polymer of good physical properties will not be obtained. For the effective control of polymerization temperature in the second reactor 5–100 percent by weight and preferably 10–15 percent by weight of the volatile components contained in the charged prepolymer solution must be vaporized and refluxed. The plug-flowing of reactants in the second reactor 12 is essential for maintaining a temperature gradient. Under such conditions as mentioned above, bulk polymerization can be effectively carried out in the second reactor 12 to produce a final product of good physical properties which has no undesirable coloring.

In order to further explain the method of the present invention, specific reference will now be made to the figures.

In FIG. 1, the monomer solution is charged into the first reactor 10 from the holder by a transferring device 30 such as gear pump. The monomer solution, if necessary, may be pre-heated by a pre-heating device 32 such as a line mixer before it is charged into the reactor 10. Complete mixing of reactants can be maintained with a stirring device such as helical ribbon-type stirrer 34, and the polymerization temperature is controlled by the heating device 20 and by adjustment of the amount of the monomer which is vaporized, condensed, and refluxed. The device 14 for vaporing, condensing and refluxing the monomer is comprised of a cooling device 36 which cools the portion of the interior wall of the reactor 10 that makes a contact with the vapor phase portion, a pressure controlling device 38 which controls the pressure in the vapor phase portion, a solution receiving duct 40 positioned at the interior wall of the reactor, a tube, a condensed solution holder 16 having the outlet for water at the bottom, thereof, and a recycling apparatus 18. As a cooling device 20, a cooling jacket is conveniently used. Cooling or warming water is introduced into the cooling jacket. The device 38 is composed of two valves, one to increase pressure, and the other to reduce pressure. The appropriate quantity of volatile components contained in the monomer solution is vaporized by controlling the pressure of the vapor phase portion to the desirable range by means of the device 38. The vapor thus generated is condensed on the interior wall of the reactor and is received in the solution receiving device 38. The solution receiving duct 40 is positioned so that the upper end thereof is positioned over the reactant surface, and preferably the lower part thereof, is also positioned in the same manner.

The condensed solution is received and held in the receiving duct 40, is fed into the holder 16 which is outside the reactor 10. As the holding tank 16, a tank having an outlet at the lower part, with a cooling device is usually employed.

The condensed solution is separated into two layers, an upper layer consisting of vinyl compounds and a lower layer consisting of water. Water is taken out through the outlet at the bottom, and the vinyl compounds are recycled with the first reactor 10 through a recycling pipe by a transferring device such as a plunger-pump 18.

In this embodiment it is also possible to employ the method in which the condensed solution is divided into two layers in the solution receiving duct 40 and water is transferred into the holder, while the vinyl compound of the upper layer is overflowed back into the reaction mixture.

The prepolymer solution which is obtained by polymerizing the monomer solution in the first reactor until the concentration of the solid component reaches 40–75 percent by weight, is continuously removed from an outlet 40 and then is charged into the second reactor 12 by a transferring device such as a gear pump. The prepolymer solution, if necessary, may be preheated by a preheating device 44, such as a line-mixer. In the second reactor 12 the condition of mixing that makes the plug-flowing of reactants possible is maintained by a stirring device 46, and the preferable temperature gradient can be maintained by a heating device 28 by which reactants are heated to a different temperature as the reaction proceeds. What is more, polymerization in the second reactor can be homogeneously carried out by controlling the quantity of volatile compounds vaporized.

In the second reactor 12, the volatile compound is vaporized, condensed, and refluxed in the same manner as in the first reactor. The monomer solution recovered from the second reactor 12 may be recycled to either the first reactor 10 or the second reactor 12. The former procedure is preferred because there is a danger in the latter procedure that the monomer ratio of the polymer finally obtained will become non-uniform due to the difference in the monomer composition of the recycled monomer solution and the monomer solution in the reaction system.

Molten polymers are continuously extruded through a die 48. The extruded guts are cooled and solidified in the cooling bath 50, and cut into chips by a cutter 52 and they can be directly subjected to the shaping process.

If necessary, a vented type extruder 54 can be provided adjacent to the outlet 56 of the second reactor 12 and thereby molten polymers can be extruded while the volatile component that is present in molten polymers is still being removed.

Figure 2:
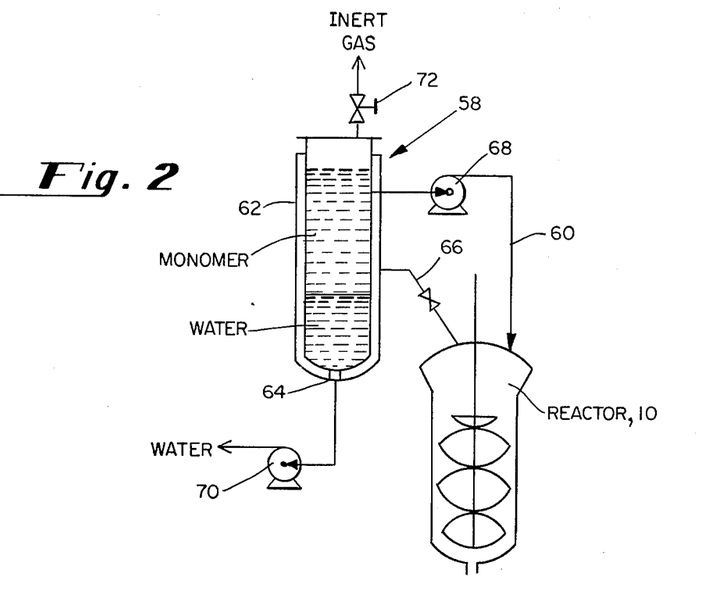
FIG. 2 is a schematic illustration of apparatus used in a second embodiment of this invention for the evaporation, condensation, and recycling processes employed in this invention.

An alternate embodiment is shown in FIG. 2 which can be used in place of the condensing apparatus employed in the apparatus illustrated in FIG. 1. The device 58 is comprised of a vapor pipe 66, a sealed condenser 62 having an outlet 64 at the lower part of the vessel, a recycling pipe 60, and pumps 68 and 70. It is convenient to use as the condenser 62 a tank which has a gas-outlet 72 at the upper part and which can be cooled exteriorly. It is necessary to percharge the condenser with a solution of water and vinyl compounds which have almost the same composition as the condensed monomer solution. In the condenser 62, the vinyl compound is the upper layer and the water is the lower layer. The vinyl compound or water can be removed from the condenser 62 by pump 68 or pump 70, respectively. The quantity of the volatile component fed into the condenser is maintained at a level which is about equivalent to the amount of water and vinyl compound removed from the condenser 62. In this way the quantity of volatile component vaporized off, is effectively controlled by adjusting the quantity of removal of the vinyl compound and water. The vinyl compound removed by pump 68 is recycled into the first reactor 10 or to the second reactor through a recycling pipe 60. Small amounts of gas such as $N_2$, or air which collect in the upper part of the condensor 12 can be removed by opening the gas-outlet 72.

Figure 3:
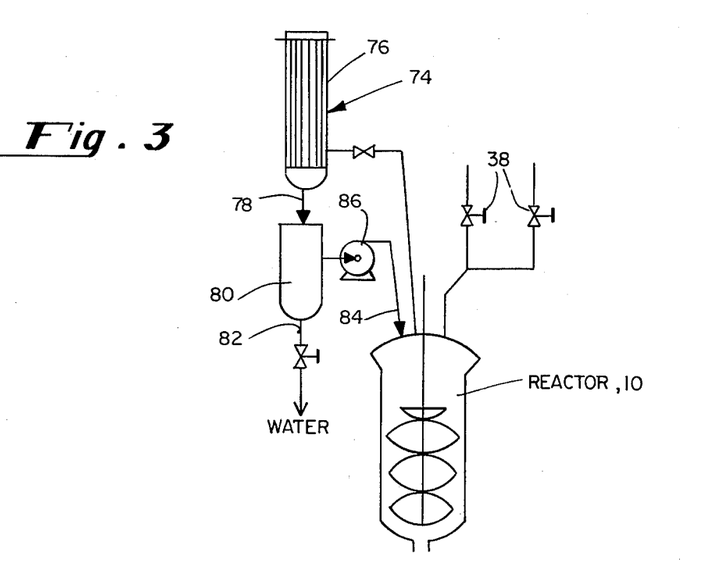
FIG. 3 is a schematic illustration of the apparatus used in a third embodiment of this invention for the evaporation, condensation, and recycling processes employed in this invention.

An additional embodiment for the control of the content of vapor, condensing the vapor, separating the water from the resulting monomer solution and refluxing of the condensed monomer is shown in FIG. 3.

The device 74 is composed of a pressure controlling device 38, a condensor 76, a pipe 78, a water separator 80 having the outlet 82 in the lower part thereof, and a recycling pipe 84.

In this embodiment 74 the quantity of volatile component vaporized is controlled by adjusting the pressure in the vapor portion of the reactor 10 by means of the pressure-controlling device 38. The vapor generated from the reaction mixture is introduced into the condensor 76 and is condensed. The resulting solution is introduced into a water separator 80 through a pipe 78 and is separated into two layers. The upper layer is the vinyl compound and the lower layer is water. The water is removed from the outlet 82 of the water separator 80. The vinyl compound is recycled into the reactor by pump 86 through a recycling pipe 84.

According to this invention, the polymer finally obtained is continuously extruded in the molten state from the lowest part of the second reactor 12. The extruded gut of polymer is cooled until it solidifies and is then cut into chips by a cutter. It is also possible to directly shape the molten polymer into an article without obtaining chips.

According to this invention a rubber modified thermoplastic resin which has no undesired color and has good physical properties can be continuously and effectively produced on a commercially feasible scale.

The following examples are given by way of further illustration of the method of the present invention and are not intended to limit the scope of the invention beyond that of the subjoined claims. All parts and percentages are parts and percentages by weight, not volume, unless otherwise noted.

In the following examples the reported values were obtained in the following manner.

Melt viscosity was obtained as Newtonian flow by extruding the polymer sample from a capillary tube (1 mm × 0.5 mm) at 220 C° under a load of 50 kg/cm².

Tensile strength at yield was measured in accordance with ASTM-D638-61T (Unit = kg/cm²).

Tensile elongation at yield was measured in accordance with ASTM-D638-61T (Unit = %).

Tensile strength at break was measured in accordance with ASTM-D638-61T (Unit = kg/cm²).

Tensile elongation at break was measured in accordance with the method of ASTM-D638-61T (Unit = %).

Izod Impact Strength was measured in accordance with Method A of ASTM-D-256-56 (Unit = kg.cm/cm notch)

EXAMPLE 1

Styrene and acrylonitrile were emulsion graft polymerized onto a polybutadiene latex (average particle size 0.25%, gel content 75%, total solid 53%) according to the following procedure.

Polymerization Mixture

| Ingredients | Parts |
| --- | --- |
| Polybutadiene latex (solid) | |
| Styrene | 21.0 |
| Acrylonitrile | 9.0 |
| Tert-dodecylmercaptan | 0.1 |
| Potassium persulfate | 0.3 |
| Sodium Laulate | 0.5 |
| Deionized Water | 170.0 |

Polymerization Conditions

| | |
| --- | --- |
| Polymerization temperature | 60°C |
| Polymerization time | 6 hours |

70 parts of styrene and 30 parts of acrylonitrile were added to 100 parts of the resulting latex (polymer content 37%). The mixture was blended and 0.5 parts of magnesium sulfate was added in the form of 10% aqueous solution and the mixture was stirred. While stirring, the polymer in the latex was extracted into the monomer phase. This monomer solution phase was isolated from the water phase by centrifuging. Rubbery polymer particles were dispersed in the monomer solution. The composition of the monomer solution was as follows:

| | |
| --- | --- |
| Polybutadiene | 17.3% |
| Resinous graft polymer | 7.2% |
| Styrene Monomer | 47.5% |
| Acrylonitrile Monomer | 19.0% |
| Water | 9.0% |

To this solution, 0.3 parts of tert-dodecylmercaptan was added to prepare as the above mixture for bulk polymerization.

Continuous bulk polymerization was carried out by using polymerization equipment consisting of (1) a first reactor of the autoclave type having 35 liter capacity, a helical ribbon type agitator and equipment for evaporating the monomer, condensing the monomer and a holding tank of 5 liter capacity for holding condensed monomer and (2) a second reactor of the tower type having a 35 liter capacity. The second reactor did not have an agitator but did not include apparatus for evaporating off the monomer and condensing it for return to the first reactor. The reactor system is schematically illustrated in FIG. 1.

The raw material was preheated to 100°C in a line-mixer and fed to the first reactor at the rate of 9 kg/m. The first reactor was held at 110°C. After four hours average retention time the polymer content of the reaction mixture was 62%. The pressure in the first reactor was maintained at 1.2 kg/cm² gauge. A monomer-water mixture of 45–55 percent by weight of the starting mixture was evaporated onto the upper surface of the reactor and condensed on the reactor inner wall which was cooled to 30°C. The condensed monomer-water mixture flowed into a channel on the reactors inside wall and was pumped in a condensate tank.

The condensed monomer-water mixture was decanted and separated in the condensate tank. The lower layer of water was pumped out of the system continuously at the rate of 8 percent by weight of the feed of raw material. The upper monomer layer was continuously pumped back to the first reactor during the polymerization. The polymerization reaction was easily controlled. The temperature, the evaporation rate, and the discarded water rate were kept constant throughout the entire reaction.

The resulting prepolymer was continuously fed to a second tower type reactor by a gear pump. The uppermost section of the wall of the second reactor was maintained at 30°C, to condense the vapors. The upper layer in the tower was maintained at 140°C, the middle layer at 175°C and at the bottom outlet at 220°C so that the temperature was gradually increased from the top to the bottom of the tower.

The reaction mixture was kept flowing down from top to the bottom in the state of plug flow. After about 4 hours retention time 98% conversion was reached. During the polymerization the pressure of the gaseous phase in the tower was controlled at 4 kg/cm² gauge with the monomer content of the condensate being 15 percent by weight of the feed of raw material. The condensate was fed into a duct around the inside of the tower reactor and pumped to the condensate tank as in the first reactor. The condensate was decanted and separated as in the first reactor and the lower layer of water was continuously discarded at the rate of 0.7 percent by weight of the feed raw material. The upper monomer layer was pumped back to the first reactor.

During the polymerization, the reaction was quite easily controlled. The temperature gradient, evaporation rate, reflux rate, discarding rate of water and conversion were all held constant. The resulting polymer was continuously fed with some stabilizers to a vented type extruder and the residual monomer and volatile materials were removed.

The extruded gut was cut into slightly yellowish white pellets. The physical properties of the polymer pellets (A) which were produced were evaluated after 24 hours and were found to have very excellent properties as shown in Table 1.

The polymerization process was run continuously for 7 days. During this period, the whole polymerization reaction system was quite steady and constant. The polymer produced was quite excellent and constant with properties similar to those in the Table 1.

COMPARATIVE EXAMPLE 1

Example 1 was repeated using the same raw material and the same polymerization equipment, except certain operation conditions were changed.

The operation conditions were as follows:
Raw material feed rate —5 kg/h.
Polymerization temperature in the first reactor — 90°C.
Retention time in the first reactor — 8 hour reactor.
Conversion in the first reactor — 55%.
Pressure in second reactor — 7 kg/cm² gauge.
Temperature at the top of second reactor — 170°C.
Temperature at the bottom of second reactor — 270°C.

The change in operation conditions in the second reactor tower was made because of the high viscosity of the product produced in the first reactor, in order to be able to advance the product from top through bottom of the second reactor.

The resulting polymer pellets (B) were deeply colored yellow-brown and the melt viscosity of the resin was too high to be used in molding.

The physical properties of this resin are shown in Table 1.

COMPARATIVE EXAMPLE 2

Example 1 was repeated using the same raw material and the same polymerization equipment, except the following operation conditions were used.

The operation conditions were as follows:
Polymerization temperature — 140°C in the first reactor.
The feed rate of raw material — 15 kg/h.
Retention time in the first reactor — 2 hours.
Conversion in the first reaction — 66%.
Operation condition in second reactor tower was the same as in Example 1.

The resulted polymer pellets (C) were slightly yellowish-white. The polymer was brittle as compared with the product of Example 1, as shown in Table 1,

COMPARATIVE EXAMPLE 3

Example 1 was repeated using the same raw material, the same polymerization equipment and under the same operation condition as Example 1 except the pressure was kept at 3 kg/cm² (gauge) in the first reactor. The temperature was increased so much that it was impossible to continuously polymerize the mixture. In addition, it was impossible to control the amount of refluxing of the monomer to the desired range. Only the polymer pellets (D) have poor coloring and poor physical properties were obtained as shown in Table 1.

On the other hand, when polymerization was carried out while keeping the pressure in the first reactor at 0.2 kg/cm² (gauge), the reaction temperature became so low that it was impossible to continuously polymerize the mixture while keeping the refluxing monomer amount constant. In addition, an insufficient amount of water was removed from the first reactor and the operation of the second reactor was not effectively conducted. The polymer pellets (E) obtained had a low impact strength as shown in Table 1.

EXAMPLE 2

This example was carried out in the same manner as Example 1 except the monomer evaporator, monomer condenser and reflux equipment which were changed, to the equipment shown in FIG. 3. In the first reactor, the temperature of the gaseous phase was kept at 140°C without cooling and the pressure was controlled at 1.2 kg/cm² gauge by the pressure controlling valve.

The evaporated monomer water mixture which corresponded to 45–55 percent by weight of the raw material feed was fed to the condenser through a vapor pipe which was kept warm at 140°C by a jacket. The condenser monomer water mixture was decanted in the water separating tank having 5 liter capacity. The lower layer of water was pumped out of the system continuously at the rate of 8 percent by weight of the raw material feed. The upper monomer layer was continuously pumped back to the first reactor by a pump.

In the second reactor, the temperature and the pressure of the gaseous phase were kept at 180°C and 4 kg/cm² gauge respectively. In the same manner as in the first reactor, the monomer water mixture of approximately 15 percent by weight of the feed prepolymer was evaporated from the reactor and led to the condenser. The condensed monomerwater mixture was decanted in the same way as in the first reactor and the lower layer of water was pumped out of the system continuously at the rate of 0.7 percent by weight of the prepolymer. The upper monomer layer was pumped back to the first reactor. The polymerization was continued for 4 days, and during this period the whole polymerization system ran at a steady and constant condition.

Table 1 shows the physical properties of the polymer pellets (F) which were produced 24 hours after the start of the polymerization run.

Table I

| Polymer Pellet No. | Melt Viscosity (poise) | Tensile Strength At Yield (kg/cm²) | Tensile elongation at yield (%) | Tensile Strength at break (kg/cm²) | Tensile elongation at break (%) | IZOD Impact Strength (kg.cm/cm notch) |
|---|---|---|---|---|---|---|
| (A) | 6.0×10³ | 440 | 4.0 | 376 | 17 | 26 |
| (B) | 18.0×10³ | 470 | 4.1 | 380 | 15 | 22 |
| (C) | 1.1×10³ | 320 | 2.6 | 290 | 13 | 7 |
| (D) | 2.1×10³ | 340 | 3.1 | 315 | 14 | 9 |
| (E) | 10.0×10³ | 345 | 4.0 | 280 | 21 | 16 |
| (F) | 5.6×10³ | 400 | 4.0 | 345 | 18 | 25 |

EXAMPLE 3

110 parts of styrene was added to 100 parts of polybutadiene latex (average particle size 0.3μ gel content 80%, total solid 62%) and after being well mixed for 30 minutes, 1 part of magnesium sulfate per 100 parts of polybutadiene was added in the form of 10% aqueous solution and stirring continued. After about 15 minutes, the mixture was separated into the water and a crumb which was semi-transparent and gelatinous. The crumb was isolated from water by a centrifuge. Additional styrene and acrylonitrile were added to the crumb, and the mixture whose composition was 27.3 percent by weight polybutadiene, 44.5 percent by weight styrene, 19.1 percent by weight acrylonitrile and 9.1 percent by weight of water was obtained. The mixture was the white emulsion-like viscous solution. To this solution 0.12 parts tert-dodecylmercaptan based on the total weight of the mixture was added to prepare the raw material for the following mass polymerization.

The polymerization equipment used was the same as the Example 1, except the monomer evaporator monomer condensor, and reflux equipment, which in the first reactor were replaced with the apparatus shown in FIG. 2. The closed type condenser had an 8 liter volume and the length to diameter ratio of 4:1.

A water separator was attached, and the condenser was charged with preliminary feed which consisted of 4 liters of water and 4 liters of a monomer mixture whose composition was 22 percent by weight styrene and 78 percent by weight acrylonitrile. This condenser was equipped with a monomer outlet pipe in the upper section and a water drain pipe in the lower section. An evaporating tube was connected from the first reactor to the middle of the condenser. The raw material was preheated to 70°C by an line mixer and fed at the rate of 10 kg/hr to the first reactor which had the equipment described above. The first reactor was kept at 125°C and after 2.5 hours average retention time, the polymer content of the reactant reached to 65%. The resulted prepolymer was continuously fed to the second reactor by a gear pump. During the polymerization, the water and monomer were removed from the condenser by plunger pumps so that the monomer water mixture of 35–45 percent by weight of the feed raw material was removed from reactor to the condenser. The evaporated vapor was immediately condensed and was separated into the two phases, consisting of the upper monomer layer and the lower water layer. The lower water layer was discarded, and the upper monomer layer was pumped back to the first reactor through the reflux tube. Because of the water and the monomer pumping rate was kept constant by the pumps, a monomer-water mixture of 35–45 percent by weight of the feed raw material was constantly condensed on the cooled surface of the first reactor. The amount of refluxed monomer and drained water was also kept constant. Accordingly, it was easy to control the temperature. The obtained prepolymer in the first reactor was preheated to 120°C by an line mixer and continuously fed to the second reactor by a gear pump.

The cooling wall of the second reactor was kept at 30°C. The upper layer in the tower was kept at 140°C, the middle layer at 180°C and the bottom outlet at 220°C, so that a smooth temperature gradient was obtained from top through to the bottom of the tower.

The reaction mixture was kept flowing down from the top to the bottom in the state of plugflow. After about 3 hours retention time, 98% conversion was reached and the polymer which was almost completely polymerized was obtained continuously in a molten state. During the polymerization, the pressure of the gaseous phase of the second reactor was controlled at 4 kg/cm² gauge and the monomer of approximately 12 percent by weight of the prepolymer was evaporated and condensed on the cooled reactor vessel wall. The condensate was led to the duct 2 equipped around the inside of the tower and pumped out to the condensate tank as described previously. The condensate was decanted and the lower layer water was continuously discarded at the rate of 3.5% of the feed raw material. The upper monomer layer was pumped back to the first reactor. The polymer which was obtained from the outlet of the second reactor was continuously fed with some stabilizers to a vented type extruder and the residual monomer or volatile materials were vented. The extruded gut was cut into slightly yellowish white pellets. Thus the obtained pellets (PBD=30%, ST=49%, AN=21%) throughout polymerization period, had an excellent physical property as indicated in the following table.

Table II

| | |
|---|---|
| Melt Viscosity | 6.5×10³ poise |
| Tensile strength at yield | 350 kg/m² |
| Tensile elongation at yield | 4.5% |
| Tensile strength at break | 290 kg/cm² |
| Tensile elongation at break | 45% |
| Izod impact strength | 30 kg.cm/cm notch |

The polymerization process was continually run for 10 days. During the entire run the polymerization rate, the evaporation rate, reflux rate, discarding rate of water, temperature gradient and conversion were all kept constant in both reactors.

COMPARATIVE EXAMPLE 4

Example 1 of the specification in the aboveidentified application was repeated using the same polymerization equipment and the same raw materials, except that the water content of the raw materials was 4.5% by weight. The operating conditions were as follows:

| | |
|---|---|
| First Reactor | |
| Raw material feed rate | 9kg/hr |
| Polymerization temperature | 110°C |
| Retention rate | (a) 4 hr |
| | (b) 2.5 hr |
| Conversion | (a) 60% |
| | (b) 35% |
| Pressure | 1.2 kg/cm² |
| Monomer recycling rate | 40% of feed rate |
| Second Reactor | |
| Polymerization temperature | Upper layer 140°C |
| | Middle layer 175°C |
| | Bottom layer 220°C |
| Polymerization pressure | 4kg/cm² |
| Monomer recycling rate | 15% of feed rate |

The following results were observed. With a retention time of 4 hours, to reach 60% conversion in the first reactor, temperature control was quite difficult because of fractionation of monomer vapors, and in fact, it was impossible to continue the polymerization operation, since the polymer could not be produced.

With a retention time of 2.5 hours, to reach 35% conversion in the first reactor, it was possible to control the polymerization temperature and the polymers could be produced continuously, although physical properties, especially impact strength and tensile strength were poor, i.e., about 20% compared with the polymer obtained by Example 1.

Comparative Example 4 represents attempted practice of the present invention, wherein the water content of the raw material is 4.5%. It demonstrates the difficulty in temperature control and the resulting inferiority of the material produced by attempted practice of the invention in such a manner with such low water content.

COMPARATIVE EXAMPLE 5

Example 5 of the application was repeated using the same raw materials and the same polymerization equipment under the same operating conditions, except that the monomer recycling rate in the second reactor for each of two samples was kept at 3% and 25%, respectively, of the feed rate. Both of the resulting polymers were quite inferior in color to the polymer obtained in Example 1.

Comparative Example 5 represents attempted practice of the invention, wherein the monomer recycling rate in the second reactor is in one sample below, and in another sample above, that specified in the aboveidentified application. This Comparative Example demonstrates the inferior quality of the polymer product obtained.

COMPARATIVE EXAMPLE 6

110 parts of styrene were added to 100 parts of polybutadiene latex (average particle size 0.3μ, gel content 80%, and total solids content 62%) and after being well mixed for 30 minutes, 1 part of magnesium sulfate per 100 parts of polybutadiene were added in the form of a 10% aqueous solution and stirring was continued. After about 15 minutes the mixture was separated into water and a crumb which was semi-transparent and gelatinous. The crumb was isolated from water by centrifuging. Additional styrene and acrylonitrile were added to the crumb, and a mixture whose composition was 10.0 percent by weight of polybutadiene, 63.0 percent by weight of acrylonitrile and 3.3 percent by weight of water was obtained. The mixture was a white emulsion like a viscous solution. To this solution 0.2 part tert-dodecylmercaptan based on the total weight of the mixture was added to prepare the raw material for the following mass polymerization. The polymerization equipment used was the same as in FIG. 3 of the drawings of the aforesaid application.

The raw material was fed at the rate of 9 Kg/h to the first reactor.

The first reactor was intended to be kept at 125°C by keeping the pressure of the first reactor at 1.2 Kg/cm$^2$ gauge, evaporating and refluxing the monomer at 30–40 percent by weight of feed raw material. However, the temperature in the first reactor could not be controlled by controlling the pressure. Further, it was impossible to continue polymerization because of the failure of temperature control.

EXAMPLE 4

Styrene, acrylonitrile, and methylmethacrylate were further added to the crumb obtained from polybutadiene latex and styrene as described in the Example 3. A mixture whose composition was 14.3 percent by weight of polybutadiene, 23.8 percent by weight of styrene, 52.3 percent by weight of methylmethacrylate, 5.2 percent by weight of acrylonitrile, and 4.8 percent by weight of water was obtained. 0.2 parts of tert-dodecylmercaptan per 100 parts of this mixture was added to prepare as the raw material for the following mass polymerization.

This example was carried out using the same polymerization equipment as Example 3. The raw material was preheated to 70°C by an line mixer and continuously fed to the first reactor at the rate of 10 kg/hr by a gear pump. The temperature of the first reactor was kept at 105°C and after 3.5 hours average retention time the polymer content of the reactant reached 55%. The resulted reactant prepolymer was fed to the second reactor by a gear pump. During this polymerization, the pressure of the gaseous phase of the first reactor was kept at 0.5 kg/cm$^3$ gauge and the monomer water mixture of 40 percent by weight of the raw material was evaporated and condensed on the reactor vessel wall. The condensate was sent to the condensate tank and in the condensate tank the condensate was separated into the two phases. The upper monomer layer was steadily pumped back to the first reactor by a plunger pump and the lower water layer was discarded at the rate approximately of 4.4 percent by weight of the feed raw material.

The obtained prepolymer from the first reactor was continuously fed to the second reactor by a gear pump. In the second reactor the mixing in the horizontal directions was maintained as in Example 3 and the temperature of the cooled section was maintained at 40°C. The temperature of the reactant was controlled giving temperature of 140°C in the upper layer and 170°C in the middle layer and 200°C in the bottom layer.

The reflux system of the second reactor was similar to that described in Example 3. A little water was contained in the prepolymer from the first reactor. During the polymerization in the second reactor the pressure of the gaseous phase was kept at 1.5 kg/cm$^2$ gauge and after 4 hours retention time 98% conversion was reached and the resulting polymer was continuously obtained from the outlet of the second reactor in the molten state. Transparent pellets were obtained continuously in the same way as the Example 3.

The physical properties of the pellet which was produced after 24 hours from the start was as follows:

Table IV

| | |
|---|---|
| Melt viscosity | 4.8×10$^3$ poise |
| Tensile strength at yield | 440 kg/cm$^2$ |
| Tensile elongation at break | 4.7% |
| Tensile strength at break | 360 kg/cm$^2$ |
| Tensile elongation at break | 22% |
| Izod Impact strength | 13 kg.cm/cm notch |

The polymerization reaction was continued for 200 hours. During this period, the whole polymerization system remained uniform and the physical properties of the produced pellets were always similar to those of the pellets after 24 hours from the start.

What we claim is:

1. The method for the manufacture of high impact resistant thermoplastic resin by continuous bulk polymerization which comprises the steps of:
    A. continuously charging a prepolymerization reactor with (1) a vinyl monomer solution of a vinyl composition which contains about 1–40 percent by weight of a diene type rubber polymer or a graft polymer obtained by extracting rubber polymer particles or vinyl monomer grafter rubber polymer particles in latex with vinyl monomers wherein said vinyl monomers consist of
        a. 60–90 percent by weight of styrene and 40–10 percent by weight of acrylonitrile or
        b. 0–70 percent by weight of styrene, 50–98 percent by weight of methylmethacrylate and 0–35 percent by weight of acrylonitrile and (2) 5–20 percent by weight of water;
    B. mixing said monomer solution so as to maintain a substantially uniform mixture;
    C. prepolymerizing said monomer solution at about 95°–130°C until the concentration of the solid contents of the resulting reaction product is about 40–75 percent by weight, with generation of vapor of water and monomer during said prepolymerization reaction;
    D. while simultaneously condensing the vapor volatilized during the prepolymerization reaction, separating the monomer solution from the resulting condensate and recycling the monomer solution at a rate of 20–60 percent by weight of feed monomer solution back to the prepolymerization reaction whereby a prepolymer solution is obtained;
    E. charging said prepolymer solution in a polymerization reactor;
    F. plug-flow advancing said prepolymer solution through said second reactor while gradually heating said prepolymer solution in a plurality of stages, starting at a temperature of about 100°–170°C up to about a temperature of 170°–270°C, polymerizing said prepolymer solution while vaporizing and recycling 5–20 percent by weight of the volatiles until the concentration of the solid components is at least about 90 percent by weight.

2. The method according to claim 1 wherein said graft polymer is obtained by graft polymerizing 2–45 parts of said vinyl compound onto 55–98 parts of said diene type rubber polymer in the emulsion rate.

3. The method according to claim 1 wherein the diene type rubber polymer is selected from the group consisting of polybutadiene, styrene-butadiene copolymer, and acrylonitrile-butadiene copolymer.

4. The method according to claim 1 wherein the amount of the vapor volatilized from the monomer solution during prepolymerization is maintained at 20–60 percent by weight of the charged amount of monomer solution by controlling the pressure within said first reactor at 0.5–2 kg/cm² gauge.

5. The method according to claim 1 wherein the vapor volatilized off is thereafter separated in a first portion comprised of the monomer solution which is condensed and recycled to said first reactor and a second portion comprised essentially of water which is discarded.

6. The method according to claim 1 wherein an amount 20–60 percent by weight of the monomer solution charged into the said first reactor is vaporized from the reaction mixture and separated in a first portion comprised of said monomer solution which is condensed and recycled to said first reactor and a second portion comprised of water which is discarded, said amount of vaporized composition being maintained by controlling the rate of condensate recovery from said first reactor.

7. The method according to claim 1 wherein said prepolymer solution is polymerized to a solids content of 55–65 percent by weight.

8. The process according to claim 1 wherein 5–10 percent by weight of the volatilized compound is condensed and refluxed in said second reactor.

9. The method defined in claim 1 wherein said percent by weight of water is 5–15 percent.

* * * * *